United States Patent [19]

van Aalten et al.

[11] Patent Number: 4,720,398

[45] Date of Patent: Jan. 19, 1988

[54] PROCESS FOR THE IMPROVEMENT OF THE ADHESION TO RUBBER OR A THERMOPLASTIC ELASTOMER OF SYNTHETIC YARNS, CORDS OR FABRICS MADE THEREFROM

[75] Inventors: Hendricus A. A. van Aalten, Westervoort; Freerk R. van Calker, Lathum; Willem E. Weening, Zevenaar, all of Netherlands

[73] Assignee: Akzo nv, Arnhem, Netherlands

[21] Appl. No.: 711,803

[22] Filed: Mar. 14, 1985

[30] Foreign Application Priority Data

Mar. 19, 1984 [NL] Netherlands ............... 8400870

[51] Int. Cl.$^4$ ............... B05D 5/10; B05D 3/02
[52] U.S. Cl. ............... 427/208.2; 57/7; 57/242; 57/251; 57/297; 152/451; 152/565; 156/307.5; 156/331.4; 156/910; 427/389.9; 427/412; 428/295; 428/395; 524/591; 524/840
[58] Field of Search ............... 427/385.5, 389.9, 393.5, 427/412, 412.1, 413, 207.1, 208.8, 208.2; 428/395, 295; 156/910, 331.4, 307.5; 152/451, 565; 524/591, 840; 57/237, 241, 242, 250, 251, 258, 7, 297, 902

[56] References Cited

U.S. PATENT DOCUMENTS

| | | | |
|---|---|---|---|
| 3,617,352 | 11/1971 | Shima et al. | 428/287 |
| 3,773,729 | 11/1973 | Wakimoto et al. | 525/440 X |
| 3,997,592 | 12/1976 | Aufdermarsh | 524/591 X |
| 4,036,801 | 7/1977 | Matsuda et al. | 524/591 |
| 4,163,094 | 7/1979 | Turpin | 528/45 |
| 4,239,878 | 12/1980 | Kobayashi et al. | 528/60 X |
| 4,433,017 | 2/1984 | Goto et al. | 528/45 |

FOREIGN PATENT DOCUMENTS

| | | |
|---|---|---|
| 0084453 | 7/1983 | European Pat. Off. |
| 0083232 | 7/1983 | European Pat. Off. |
| 3234590 | 4/1983 | Fed. Rep. of Germany |
| 1520505 | 4/1968 | France |
| 2092066 | 1/1972 | France |
| 2426718 | 12/1979 | France |

Primary Examiner—Donald E. Czaja
Assistant Examiner—Thomas Bokan

Attorney, Agent, or Firm—Stevens, Davis, Miller & Mosher

[57] ABSTRACT

A process for the improvement of the adhesion to rubber or a thermoplastic elastomer of synthetic yarns, cords or fabrics made therefrom by applying thereto an adhesive consisting of an aqueous solution or dispersion of a polyurethane with ionic groups, capped isocyanate groups and groups with a Zerewitinoff-active H atom, followed by drying the product thus treated. The polyurethane corresponds to the structure:

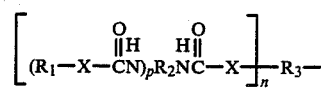

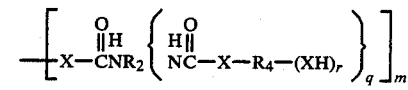

wherein X has the meaning of an O or S atom or of an O-, S-, N- or P-containing group with a Zerewitinoff-active H atom or to which prior to reaction with an isocyanate group a Zerewitinoff-active H atom had been attached, $R_1$ represents the remainder of a capping agent, $R_2$ represents an at least divalent organic group which remains after removal of isocyanate groups from a polyisocyanate, $R_3$ represents an at least divalent organic group which remains after removal of —XH groups from an organic compound having a molecular weight of 62 to 2000, $R_4$ represents an ionic group or a potentially ionic group which remains after removal of —XH group(s), m is a number $\geq 1$ and $\leq 4$, n is a number $\geq 1$ and $\leq 4$, p is a number $\geq 1$ and $\leq 3$, q is a number $\geq 1$ and $\leq 3$, and r is a number $\geq 0$ and $\leq 3$.

The present process is especially suitable for the treatment of aromatic polyamide yarns, cords or fabrics to be incorporated into automobile tires or V-belts.

15 Claims, No Drawings

PROCESS FOR THE IMPROVEMENT OF THE ADHESION TO RUBBER OR A THERMOPLASTIC ELASTOMER OF SYNTHETIC YARNS, CORDS OR FABRICS MADE THEREFROM

The invention relates to a process for the improvement of the adhesion to rubber or a thermoplastic elastomer of synthetic yarns, cords or fabrics therefrom by applying thereto an adhesive consisting of an aqueous solution or dispersion of a polyurethane with ionic groups, capped isocyanate groups and groups with a Zerewitinoff-active H atom.

A process of the type indicated above is described in French Patent Specification No. 2 092 066.

In the preparation of the dispersions which are anionic as a result of the presence of the carboxylate groups use is always made of products of a relatively high molecular weight and with an acid number between 30 and 350 and 2 to 20 OH groups per molecule, which products are subsequently reacted with partly capped polyisocyanates.

To prevent the dispersions from hydrolysing under the influence of the high acid number it is preferred that the free OH groups and carboxylate groups-containing polymers are prepared from ethylenically unsaturated, free carboxyl groups-containing monomers polymerizable under the influence of radicals. The resulting polymers generally have a relatively high molecular weight, as a result of which the dispersions prepared therefrom are more suitable for use in electrocoating and less suitable for use in adhesive compositions of the type mentioned in the opening paragraph.

The drawbacks to the known process are largely obviated by the present invention, which provides a process for the improvement of the adhesion to rubber or a thermoplastic polymer of synthetic yarns, cords or fabrics.

The invention consists in that in a process of the well-known type indicated in the opening paragraph the polyurethane corresponds to the following structure:

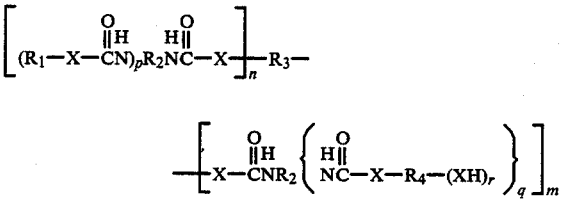

wherein X has the meaning of an O or S atom or of an O-, S-, N- or P-containing group with a Zerewitinoff-active H atom or to which prior to reaction with an isocyanate group a Zerewitinoff-active H atom had been attached, $R_1$ represents the remainder of a capping agent, $R_2$ represents an at least divalent organic group which remains after removal of isocyanate groups from a polyisocyanate, $R_3$ represents an at least divalent organic group which remains after removal of —XH groups from an organic compound having a molecular weight of 62 to 2000, $R_4$ represents an ionic group or a potentially ionic group which remains after removal of —XH group(s), m is a number $\geq 1$ and $\leq 4$, n is a number $\geq 1$ and $\leq 4$, p is a number $\geq 1$ and $\leq 3$, q is a number $\geq 1$ and $\leq 3$, and r is a number $\geq 0$ and $\leq 3$.

Within the scope of the invention all kinds of ionic groups qualify for incorporation into a polyurethane. Of particular interest are ionic groups, such as ammonium ions, sulphonate ions or a carboxylate ions. The present invention can also use cationic polyurethane dispersions. For, the degree of adhesion of the products treated with these dispersions appears to be higher than that of products treated with corresponding anionic dispersions.

The special feature of the ionic polyurethane dispersions to be used in the process according to the invention is that in addition to groups with a Zerewitinoff active H atom they contain capped isocyanate groups which are unblocked at elevated temperatures and enter into reactions with a Zerewitinoff active H atom as present in a hydroxyl group, as a result of in situ self-crosslinking. It has been found that the adhesive properties of yarns, cords or fabrics treated with such a dispersion are generally far superior to those treated with dispersions which do not contain groups with a Zerewitinoff active H atom, as are described in German Patent Application No. 32 34 590 or French Patent Specification No. 1 520 505.

It should be noted that the polyurethane dispersions to be used in the process according to the invention are known in themselves from French Patent Specification No. 2 426 718 and U.S. Pat. No. 4,163,094. Neither patent disclosure makes the slightest allusion to the polyurethane dispersions being suitable for improving the adhesion to rubber or a thermoplastic elastomer of synthetic yarns, cords or the fabrics made therefrom. Nor do the curing times of 15 minutes or longer mentioned in the examples suggest that one skilled in the art would apply them in a case which normally requires a curing time of not longer than 2 minutes.

The ionic groups in the polyurethanes according to the invention may originate from a compound of the formula $R_4(XH)_{r+1}$, wherein $R_4$, X and r have the meaning mentioned above or derived from such isocyanates modified with ionic or potentially ionic groups as are described in German Patent Specifications Nos. 19 39 911, 22 27 111, 23 59 613 or 23 59 614. As examples thereof may be mentioned sulphonated aromatic diisocyanates such as 2,4-toluene diisocyanate or 4,4'-diphenylmethane diisocyanate. Also suitable for use are diisocyanates which react with amines as quaternizing agent, such as chlorohexyl diisocyanate, m-chloromethylphenyl diisocyanate and p-benzyl-chloride-2,4-diisocyanate. By reaction with, say, tertiary amines also homopolar-bonded cationic groups are introduced into the polyaddition product.

Examples of compounds of the formula $R_4(XH)_{r+1}$ are:

for r=0: N,N-dimethylethanol amine for r=2: triethanol amine for r=3: N,N,N',N'-tetrakis($\beta$-hydroxyethyl)ethylene diamine.

Particularly favourable results have been obtained with polyurethanes in which the ionic groups originate from a compound of the formula HXR$_4$XH, wherein R$_4$ and X have the meaning given above.

The polyurethanes considered are those wherein R$_4$ in the first-mentioned formula is derived from a compound of the formula H$_2$NR$_4$NH$_2$, such as the diamino sulphonates described in Canadian Patent Specification No. 928 323. An example thereof is the sodium salt of N-(2 aminoethyl)-2-aminoethane sulphonic acid.

Preference is given, however, to polyurethanes of the first-mentioned formula, wherein R$_4$ is derived from a compound of the formula HOR$_4$OH, of which the N-alkyl dialkanol amines form part, such as N-methyl diethanol amine, N-ethyl diethanol amine or N-propyl dipropanol amine.

Very favourable results have been obtained when for the compound HOR$_4$OH use was made of N-methyl diethanol amine or 1,2-propane diol-3-dimethyl amine.

R$_3$ in the first-mentioned formula for the ionic polyurethane is an at least divalent organic group which remains after removal of —XH groups from an organic compound having a molecular weight of 62 to 2000.

As examples of organic compounds of the formula HXR$_3$XH which are according to the invention suitable for the preparation of the ionic polyurethanes may be mentioned: dihydroxy polyethers, dimercapto polythioethers, polyamides with amino end groups, dihydroxy polyacetals and/or dihydroxy polyester amides. Preferably, use is made of dihydroxy polyesters.

The most favourable results have been obtained with polyurethanes wherein R$_3$ according to the first-mentioned formula is derived from a compound of the formula R$_3$(OH)$_{m+n}$, which represents a polyester having a molecular weight in the range of 300 to 1000 and an average number of hydroxyl groups in the range of 2 to 4.

The polyesters are derived from polyvalent alcohols and polyvalent acids or the ester forming equivalents of these acids. The polycarboxylic acids may be aliphatic, cycloaliphatic, aromatic and/or heterocyclic acids, which may be substituted with halogen atoms or may contain unsaturated groups.

Examples of suitable dicarboxylic acids or the ester forming equivalents thereof include: succinic acid, adipic acid, suberic acid, azelaic acid, sebacic acid, phthalic acid, isophthalic acid, phthalic anhydride, tetrahydrophthalic anhydride, hexahydrophthalic anhydride, tetrachlorophthalic anhydride, endomethylene tetrahydrophthalic anhydride, glutaric anhydride, maleic acid, maleic anhydride, fuamric acid, dimeric and trimeric fatty acids derived from oleic acid, the dimethyl ester of terephthalic acid and the bisglycol ester of terephthalic acid. As trivalent acids may be mentioned 1,2,4- and 1,3,5-benzene tricarboxylic acid.

Examples of polyvalent alcohols include: ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3 propane diol, glycerol-α-allyl ether, glycerol, trimethylol propane, 1,2,6-hexane triol, 1,2,4-butane triol, trimethylol ethane, pentaerythritol, mannitol and sorbitol, and the polyether glycols such as diethylene glycol, triethylene glycol, tetraethylene glycol, polyethylene glycol, dipropylene glycol, polypropylene glycol, dibutylene glycol and polybutylene glycol. Alternatively, the polyesters may partly or entirely be built up from lactones such as ε-caprolactone or hydroxy carboxylic acids such as ω-hydroxy caproic acid. Also suitable are polycarbonates with terminal hydroxy groups as obtained by conversion of diols such as 1,3-propane diols, 1,4-butane diol and/or 1,6-hexane diol, diethylene glycol, triethylene glycol, tetraethylene glycol with diaryl carbonates, such as diphenyl carbonate or phosgene.

The polyisocyanates suitable for the preparation of the ionic polyurethanes according to the invention are generally di- and triisocyanates. The diisocyanates may be represented by the formula OCN R NCO, wherein R represents a divalent aliphatic, cycloaliphatic or aromatic group. As examples of suitable diisocyanates of the aliphatic type may be mentioned: hexamethylene diisocyanate, 2,3-dimethyl hexamethylene diisocyanate, 2,3,4-trimethyl hexamethylene diisocyanate, metaxylylene diisocyanate, paraxylylene diisocyanate or tetramethylene diisocyanate. When R represent an aromatic group, it may be substituted with, int.al., a halogen, a lower alkyl group or a lower alkoxy group. Examples of these diisocyanates include: 1-chlorophenylene-2,4 diisocyanate, tetramethyl phenylene diisocyanate, metaphenylene diisocyanate, paraphenylene diisocyanate, naphthalene-1,5-diisocyanate, diphenyl-4,4'-diisocyanate, benzophenone-4,4'-diisocyanate, biphenyl ether or biphenyl sulphide diisocyanate, 3,3'-dimethyldiphenyl-4,4'-diisocyanate, 3,3'-dimethoxydiphenyl-4,4'-diisocyanate, 3,3'-dichlorodiphenyl-4,4'-diisocyanate, benzofuran-2,7-diisocyanate.

Examples of diisocyanates containing a cycloaliphatic group include isophoron diisocyanate, dicyclohexyl-4,4'-methane diisocyanate and cyclohexane-1,4-diisocyanate.

An example of a triisocyanate is the reaction product of diphenyl methane-4,4'-diisocyanate and the carbodiimide formed from diphenyl methane-4,4'-diisocyanate. Another example is the reaction product of 3 moles of hexane-1,6-diisocyanate and 1 mole of water.

It is preferred, however, that use should be made of polyurethanes prepared by using 2,4- and/or 2,6-toluene diisocyanate or diphenyl methane-4,4-diisocyanate (MDI).

Capping agents suitable for use in the ionic polyurethane dispersions according to the invention generally satisfy the formula R$_1$XH, wherein R$_1$ and X may have the meaning given under the first-mentioned formula. Examples of suitable capping agents include: phenols such as phenol, thiophenol, chlorophenol, cresol, methyl thiophenol, xylenol, ethyl thiophenol and resorcinol; tertiary alcohols such as tert-butanol, tert-pentanol, tert-hexanol; aromatic secondary amines such as diphenyl amine, diphenylnaphthyl amine and xylidine; imides such as succinimide and phthalimide; compounds with an activated methylene group such as the acetoacetates, acetyl acetone and diesters of malonic acid; mercaptans such as mercaptobenzothiazole, tert-dodecyl mercaptan and lauryl mercaptan; lactams such as valero lactam and butyro lactam; imines such as ethylene imines, ureas, such as urea, thio- and diethylene urea; oximes such as acetoxime and cyclohexanon oxime. Preference is given to polyurethane dispersions in which the capping agent is ε-caprolactam or methylethyl ketoxime. The polyurethane dispersions of the present invention are prepared in a manner well known to be used in chemical processes for the preparation of similar compounds.

The procedure may then be as follows.

First of all the polyisocyanate is dissolved in an anhydrous solvent inert relative to isocyanates, such as acetone.

To this solution the capping agent is added dropwise with vigorous stirring.

The resulting solution of partly capped polyisocyanate is subsequently reacted with a polymer containing an excess of groups with a Zerewitinoff-active hydrogen atom, which is preferably a branched polymer, and a (potentially) ionic group-containing compound containing preferably two Zerewitinoff-active hydrogen atoms.

On completion of the reaction and possibly total or partial conversion of the potentially ionic group into an ionic group by, for instance neutralization, an aqueous dispersion of the polyurethane is obtained after dilution with water and removal of any remaining solvent.

It has been found for the use envisaged satisfactory results may be obtained when the aqueous dispersion contains 1 to 40% by weight of polyurethane.

The optimum proportion of polyurethane in the dispersion depends on the nature of the polyurethane, the viscosity of the dispersion and the amount of polyurethane to be applied to the yarn. After having decided on the amount of polyurethane to be applied to a yarn, a cord or a fabric, it will not be difficult for a person skilled in the art to determine the optimum concentration of a given polyurethane in the first bath composition.

The polyurethane dispersion may already be applied during the production of the yarn, after which the product is dried or cured for a short time at elevated temperature and wound. The pre-treated yarn thus obtained can—if necessary after curing—be formed into a cord and via a single-bath dip in the usual resorcinol-formaldehyde-latex mixture be made suitable for adhesion to rubber.

This process offers many advantages for processors of classical yarns such as rayon or nylon yarns, who only possess single-bath equipment.

Use of a single-bath (or one-step dip) process is also of importance in the processing of blended yarns partly consisting of polyethylene terephthalate or poly-p-phenylene terephthalamide and partly of a material which only requires a one-step dip treatment, such as blended yarns of poly-p-phenylene terephthalamide and rayon. Alternatively, with the material in the form of a cord the polyurethane dispersion may be applied by a first dip bath, followed successively curing at elevated temperature and using a second bath for applying a coating of said resorcinol-formaldehyde-latex mixture to the cured sub-coating.

The aromatic polyamide yarns, cords or fabrics that according to the invention are suitable to be treated with the present polyurethane dispersions are manufactured from polyamides which are entirely or substantially built up from repeating units of the general formula.

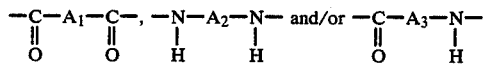

wherein $A_1$, $A_2$ and $A_3$ represent different or identical, divalent, one or more aromatic rings-containing hard segments, in which there may or may not be a heterocyclic ring, of which segments the chain extending bonds are in the position para to each other or are parallel and oppositely directed. Examples of these segments are 1,4-phenylene, 4,4'-biphenylene, 1,5-naphthylene and 2,6-naphthylene. They may or may not carry substituents, for instance: halogen atoms or alkyl groups. Besides amide groups and the above-mentioned aromatic radicals the chain molecules of the aromatic polyamides may optionally contain up to 35 mole % of other groups, such as m-phenylene groups, non-rigid groups, such as alkyl groups, or ether groups, urea groups or ester groups.

Yarns, cords or fabrics that entirely or substantially consist of poly-p-phenylene terephthalamide are particularly suitable to be provided with an adhesive composition according to the invention.

When the polyurethane dispersion has been applied to the yarn during the production process, the yarn should be dried in a short time at a temperature between 130° and 250° C. and/or cured before being wound. If also curing is to be applied, it should be done within a relatively short time (<10 sec.) and consequently at a temperature higher than when the curing process is carried out in a separate treatment.

The curing temperature is generally in the range of 220° to 300° C. for 5 to over 60 seconds. Optionally, heating may be continued up to two minutes at a temperature between 220° and 250° C. The optimum curing temperature not only depends on the time limits within which curing should take place, but also on the nature of the capping agent used. Also of influence on the optimum temperature to be used may be the amount of polyurethane dispersion to be applied to the yarn, the cord or the fabric.

For drying and curing use is made of conventional methods and equipment, such as hot drums, hot plates, hot rolls, hot gases, steam chests, infrared radiators and the like.

The above-described fully continuous process, in which the spinning of the yarn is combined with the application of the polyurethane dispersion to the wet yarn may be carried out at yarn speeds that are commonly used in spinning poly-p-phenylene terephthalamide. In general, the yarn will then go through the successive process stages at a speed higher than 200 m/min and preferably higher than 300 m/min.

The proportion of polyurethane to be applied to the yarn, cord or fabric is 0.01–5% by weight, preferably 0.3–1.0% by weight, calculated on the dry product.

To further improve the adhesion of the product it may after being cured be provided with a finish in an amount of 0.1–5% by weight, preferably 0.4–1% by weight. A preferred finish is a polyglycol ester of a fatty acid or a fatty acid mixture, for instance Leomin OR ®. Instead or moreover, the polyglycol ester or fatty acid or fatty acid mixture may be applied to the yarn in an earlier stage of the process, which may be immediately before or after drying and simultaneously or not with applying the polyurethane dispersion.

The yarn is provided with the polyurethane dispersion and finish by means of well-known liquid applicators. Suitable for use is a kiss roll of which the surface coming into contact with the yarn moves in the same direction as the yarn or in opposite direction. The kiss roll is wetted with the liquid to be applied, for instance in that the rotating kiss roll is partially immersed in the liquid.

The yarn, cord or fabric also may be provided with usual agents such as surfactants, antistatic agents and other current finish constituents.

A yarn provided with a cured polyurethane may, while in the twistless or practically twistless state, be wound into a yarn package. The yarn of these packages is particularly suitable to be used as starting material in the manufacture of cords that are used as reinforcing elements in rubber or synthetic material. This yarn may optionally be twisted before being wound into a package.

Yarns provided with a cured polyurethane according to the invention are excellently suitable to be processed into reinforcing cord. This particularly applies to yarn from aromatic polyamide. Such a cord may be obtained by twisting together one or more bundles of multifilament yarn, of which bundles at least one has entirely or partly been treated with a polyurethane according to the invention. The cord also may be obtained by twisting together bundles entirely made up of multifilament polyamide yarn treated with a polyurethane.

In some other embodiment at least part of the bundles in the cord entirely or partly consists of a multifilament polyester yarn treated with a polyurethane.

The polyethylene terephthalate and/or aromatic polyamide yarns may be used in the presence of other yarns from synthetic or non-synthetic polymers treated or not with a polyurethane resin according to the present invention. Examples thereof include yarns of polyamide, regenerated cellulose, glass, steel and carbon. The yarns, cords or fabrics according to the invention provided with a cured polyurethane resin have the advantage that they can be used as reinforcing material in the so-called self-adhering rubbers without being subjected to any further dipping treatment. They are therefore suitable to be processed by users who do not possess any dipping equipment.

For uses where high demands are made on the adhesion between the yarn or the cord and the matrix material, the cured polyurethane resin is provided with a second adhesive coating. Its composition may be the same as that of the second dipcoating applied with the usual two-bath dips. It is preferred that this second adhesive coating should consist of a cured mixture resorcinol, formaldehyde and a latex.

The invention therefore also relates to yarns, cords or fabrics of synthetic polymers provided with an adhesive composition for the adhesion of rubber substantially consisting of a first coating of a cured polyurethane applied from an aqueous solution or dispersion according to the invention, and a second coating of a cured resorcinol-formaldehyde-latex.

The term rubbers as used in the present specification refers to both synthetic and natural polymers displaying a rubbery behaviour.

The yarns, cords or fabrics treated with the polyurethane resins according to the invention also may be used as reinforcing material for other synthetic materials, including thermoplastics and thermosets.

As examples of materials that may be reinforced with these yarns, cords or fabrics may be mentioned: natural rubber, polybutadiene, polyisoprene, poly(butadiene-styrene), poly(butadiene-acrylonitrile), poly(ethylene propylene), poly(isobutene-isoprene), polychloroprene, polyacrylate, polyurethanes, polysulphides, silicones, polyvinyl chloride, polyvinylidene chloride, polyamides, polyetheresters, polymerized unsaturated polyesters and epoxy resins.

The invention will be further described in the following examples, which are of course not be construed as limiting in any manner the scope of the present invention.

On the cords treated with the polyurethane dispersions prepared in the examples given hereinafter the following properties were determined:

the adhesion to rubber by the strip peel test in conformity with ASTM D 2630—71 at a tensile rate of 10 cm/minute. The test was conducted under standard conditions (temperature 20° C., relative humidity (RH 65%). The degree of adhesion is expressed as a percentage of the adhesion obtained under the same conditions by means of a standard dip;

the rubber coverage (RC) is expressed as a percentage of the surface area of the treated cord which is covered with rubber;

the fatigue is expressed as a residual cord strength percentage of the initial strength in the ASTM test D 885-64.

The determination of the cord strength was carried out at a tensile rate of 50 cm/minute. In the case of polyester cord the running time was 24 hours at a compression of 20%. In the case of aramid cord the running time was 72 hours at a compression of 14% and an elongation of 2%. The fatigue tests were all carried out in a conditioned room, at 20° C. and 65% RH;

the dip pick-up (DPU) is expressed as a percentage by weight based on the weight of the untreated cord.

EXAMPLE 1

A solution was prepared of 200 g of diphenyl methane-4,4'-diisocyanate (MDI), (0.8 moles) in 50 ml of dry acetone. To this solution there were added, with vigorous stirring and barring air humidity, 34.8 g (0.4 moles) of methylethyl ketoxime at a rate such that the temperature did not increase beyond 40° to 50° C.

Subsequently, a mixture of 1,1,1-trimethylol propane, 1,6-hexane diol, adipic acid and phthalic anhydride in a molar ratio of 1:3:0.67:1.33 was heated to 120° C. under nitrogen until a homogeneous melt was obtained. After the addition of 0.05% of tetraisopropyl orthotitanate as catalyst the temperature was slowly increased to 220° C.–240° C., at which temperature it was kept for 1 hour until an acid number <1 was obtained.

The molecular weight of the oligoester prepared was 360. To 0.32 moles (115.2 g) of this oligoester with 2.5 OH groups per molecule and 0.4 moles (47.6 g) of 1,2-propane diol-3-dimethylamine in 50 ml of acetone there was added dropwise the previously prepared solution in acetone of partly capped MDI. Upon termination of the reaction 18.0 g of acetic acid were added. Next, with vigorous stirring, 1500 ml of water were added and a semi-transparent dispersion was formed. The remaining acetone was removed under reduced pressure, after which an aqueous dispersion of the urethane resin was obtained having a solids content of 24.1% by weight.

EXAMPLES II–XVI

Polyurethane dispersions were prepared in the same way as indicated in Example I, except that the ratio of the reaction components was varied as specified in the table below.

For all dispersions the organic polyhydroxy compound was an oligomer of the formula $R_3(OH)_{m+n}$, wherein $R_3$, m and n have the meaning given for the first-mentioned formula.

Following is a list of abbreviations used in the table below:

TMP = trimethylol propane
HD = 1,6-hexane diol
AA = adipic acid

FA=phthalic anhydride
MDI=diphenyl methane-4,4'-diisocyanate
HDI=1,6-hexane diisocyanate
TDI=2,4-toluene diisocyanate/2,6-toluene diisocyanate (ratio 80/20)
PDDA=1,2-propane diol-3-dimethylamine
NMDEA=N-methyl diethanol amine
NNDEA=N,N-dimethyl ethanol amine
MEKO=methylethyl ketoxime
HOAc=acetic acid
Mn=molecular weight The cord to be treated was fed to a trough filled with dip liquor, through which the cord while under a tension of 10N/tex was passed over a roll. Under the same tension the cord after leaving the bath passed through an oven, in which it was heated for 60 seconds at a temperature of 240° C. (Dip E) or 245° C. (PU dispersion of Example I).

The cord thus provided with a first dip coating was further provided with a resorcinol formaldehyde latex (RFL) dip in the manner commonly applied in the art.

To that end the cords while under a tension of

| Example | m;n | $R_3$ | $R_2(NCO)_2$ | $R_1XH$ | $R_4(OH)$ | Acid | Degree of neutralization (%) |
|---|---|---|---|---|---|---|---|
| II | 1.25;1.25 | TMP:HD:AA:FA = 1:3:2:0 Mn:341 | MDI | MEKO | PDDA | HOAc | 75 |
| III | 1.5;1.5 | TMP:HD:AA:FA = 3:3:1:2 Mn:370 | MDI | MEKO | PDDA | HOAc | 75 |
| IV | 1.16;1.16 | TMP:HD:AA:FA = 1:5:1:2 Mn:377 | MDI | MEKO | PDDA | HOAc | 75 |
| V | 1.25;1.25 | TMP:HD:AA:FA = 1:3:0:2 Mn:386 | MDI | MEKO | PDDA | HOAc | 75 |
| VI | 1.25;1.25 | TMP:HD:AA:FA = 1:5:4:0 Mn:605 | MDI | MEKO | PDDA | HOAc | 75 |
| VII | 1.5;1.5 | oligopropylene oxide with functionality 3 Mn:420 | MDI | MEKO | PDDA | HCl | 90 |
| VIII | 1.5;1 | TMP:HD:AA:FA = 1:3:0.67:1.33 Mn:379 | MDI | MEKO | NMDEA | HOAc | 94 |
| IX | 1.25;1.25 | TMP:HD:AA:FA = 1:7:6:0 Mn:916 | MDI | MEKO | PDDA | HOAc | 75 |
| X | 1.25;1.25 | TMP:HD:AA:FA = 1:3:0.67:1.33 Mn:379 | MDI | 6-caprolactam | NMDEA | HCl | 90 |
| XI | 1.25;1.25 | oligopropylene oxide with functionality 2.5 Mn:435 | MDI | MEKO | PDDA | HCl | 90 |
| XII | 1.37;1.37 | oligopropylene oxide with functionality 2.75 Mn:615 | MDI | MEKO | PDDA | HCl | 90 |
| XIII | 1.25;1.25 | TMP:HD:AA:FA = 1:9:8.17:0 Mn:2015 | MDI | MEKO | PDDA | HOAc | 95 |
| XIV | — | epoxidized polybutadiene after reaction with diethanolamine and semi-capped TDI | TDI | MEKO | — | HOAc | 75 |
| XV | 1.25;1.25 | TMP:HD:AA:FA = 1:3:0.67:1.33 Mn:379 | HDI | MEKO | PDDA | HOAc | 90 |
| XVI | 1.25;1.25 | TMP:HD:AA:FA = 1:3:0.67:1.33 Mn:379 | TDI | MEKO | PDDA | HOAc | 75 |

EXAMPLE XVII

A polyethylene terephthalate dtex 1100×2(472/472) tyre cord was made. The cord was dipped under the conditions commonly applied in two-step dipping systems, use being made of a widely employed commercial dip based on an epoxy compound and a capped diisocyanate (to be referred to hereinafter as dip E).

This dip was compared with various concentrations of the polyurethane dispersion prepared in Example I.

The dip process was carried out as follows.

4.5N/tex were passed into a bath of RFL dip liquor and subsequently heated for 120 seconds, while under the same tension, to a temperature of 220° C. (Dip E) or 235° C. (PU dispersion of Example I).

The RFL dip liquor had a solids content of 20% by weight and had been obtained by admixing 498 parts of water, 28.6 parts of pre-condensated resorcinol formaldehyde resin (75%), 20.8 parts of formalin (37%), 12 parts of 5% NaOH solution, 415 parts of vinylpyridine latex (aqueous dispersion with a solids content of 41% by weight) and 25.0 parts of ammonia (25%). All parts are by weight.

The properties of the cords thus treated are given in the table below.

| dip concentration first bath | RC (%) | adhesion % (Dip E = 100%) | dip pick-up (DPU) (gew. %) | fatigue (GBF) % | dipped cord linear density dtex | tenacity N | elongation % |
|---|---|---|---|---|---|---|---|
| 5,5 wt. % Dip E | 80 | 100 | 3.9 | 57 | 2541 | 143 | 13.6 |
| PU 2% | 40 | 85 | 4.6 | 99 | 2536 | 148 | 14.0 |
| PU 4% | 80 | 105 | 4.2 | 83 | 2523 | 147 | 14.4 |
| PU 6% | 80 | 105 | 4.0 | 80 | 2529 | 143 | 13.2 |
| PU 8% | 80 | 100 | 3.8 | 78 | 2573 | 144 | 13.4 |
| PU 10% | 80 | 100 | 3.9 | 84 | 2588 | 144 | 13.6 |
| PU 12% | 70 | 95 | 3.8 | 84 | 2564 | 143 | 13.3 |
| untreated cord | | | | | 2391 | 155 | 14.1 |

The results in the above table clearly show that use of a polyurethane dispersion according to the invention in the first bath leads to a distinctly better fatigue behaviour in rubber of the cord thus treated than use of the well-known dip based on an epoxy compound and a capped diisocyanate.

EXAMPLE XVIII

Of a dtex 1680 poly-p-phenylene terephthalamide yarn three filament bundles were twisted to 270 turns/m, after which the resulting bundles were formed into a cord of which the cord twist was identical with but opposite to the bundle twist. In that way a cord having dtex 1680×3 (270/270) construction was obtained. Part of the cord was dipped with an epoxy compound under conditions usually employed in the two-step dipping system. The procedure was as follows.

The cord to be treated was fed to a trough filled with the dip liquor in which the cord was passed over a roll while under a tension of 25 mN/tex.

Under the same tension the cord after leaving the bath passed through an oven, in which it was heated for 60 seconds to a temperature of 240° C. The composition of the dip liquor was as follows (the percentages are by weight):

| demineralized water | 85.87% |
|---|---|
| NaOH 5% | 2.0% |
| caprolactam | 10.0% |
| diglycidyl ether of glycerol | 2.0% |
| emulsifier (aerosol OT ®; 75% by weight solids content) | 0.13% |

The amount applied to the cord was about 0.5% by weight. The resulting cord was subsequently provided with a resorcinol-formaldehyde-latex (RFL) dip, as indicated in Example XVII. To that end the cords while under a tension of 25 mN/tex were passed into a bath of RFL dip liquor of the same composition as given in Example XVII and subsequently heated, while under the same tension, for 90 seconds at 230° C.

Another portion of the cord not treated yet was dipped in the polyurethane dispersion of Example I. The table below shows the properties obtained, after drying and applying an RFL dip, at concentrations of the polyurethane in the bath liquor of 2, 4, 6, 8, 10 and 12% by weight.

| dip concentration 1st bath | adhesion % (epoxy = 100%) | rubber coverage (RC) % | fatigue (GBF) % |
|---|---|---|---|
| epoxy 2% | 100 | (60) | 60 |
| PU 2% | 80 | (30) | 52 |
| PU 4% | 80 | (40) | 55 |
| PU 6% | 85 | (40) | 58 |
| PU 8% | 95 | (60) | 63 |
| PU 10% | 100 | (60) | 68 |
| PU 12% | 100 | (60) | 77 |

The results in the above table show that from a polyurethane dispersion in the first bath of about 8% by weight use of a polyurethane dispersion according to the invention leads to a distinctly better fatigue behaviour of a cord dipped in it than of cord dipped in a well-known dip composition based on an epoxy compound.

EXAMPLE XIX

In this example the basic material was a poly-p-phenylene terephthalamide yarn (dtex 1680 f 1000) finished with 0.1% by weight of Leomin OR, calculated on the weight of the yarn. To this yarn some amount of the polyurethane dispersion prepared in accordance with Example I was applied (2% by weight, calculated on the yarn weight), after which the yarn was cured for 8 seconds at 260° C. After curing the yarn was finished again with 0.6% by weight of Leomin OR ®.

For comparison, an identical yarn sample pre-treated with 0.6% by weight of Leomin OR ® was provided with 2.2% by weight of a finish based on glycerol diglycidyl ether, an epoxy compound which is often used in the pre-treatment of aramid type yarns, and subsequently cured for 8 seconds at a temperature of 260° C. The two yarns were subsequently twisted and cabled (dtex 1680×2; 330/330), provided with an RFL dip (20% by weight) and tested for their adhesion to rubber after curing for 60 seconds at 230°-240° C.

The results are given in the table below.

| cord | adhesion % (epoxy = 100) | RC (%) | fatigue (GBF)(%) | Dip pick-up (DPU)(wt %) |
|---|---|---|---|---|
| with PU dispersion of the invention | 100 | 60 | 68 | 7,0 |
| with well-known epoxy dip | 100 | 60 | 48 | 9,0 |

The results mentioned in the above table clearly display the unexpected, favourable effect on GBF, and hence on the fatigue behaviour of the cored, as a result of using a polyurethane dispersion according to the invention.

EXAMPLE XX

In this example it will be shown that use of a polyurethane dispersion according to the invention not only leads to better adhesion or fatigue behaviour of the yarns, cords or fabrics of poly-p-phenylene terephthalamide. For the use of the resulting cords for reinforcing V-belts with open sides is found to give hardly any problems any more due to fraying of the sides of these V-belts after they have been cut out of the rubber-cord composite.

Two cords (A) and (B) of poly-p-phenylene terephthalamide (dtex 1680×2×3) were made which were each separately dipped in a two-step dipping process. For the first dip use was made of a 10% by weight-solution in toluene of polymethylene polyphenyl isocyanate (cord A) and a 15% by weight polyurethane dispersion in water (cord B). For the two cords the second dip bath was an RFL dip liquor of the same composition and concentration as given in Example XVII.

With the well-known dip applied to cord A the drying and curing conditions were as follows:

The first dip was followed by drying for 120 seconds at 120° C. and continued drying for 60 seconds at 150° C. Applying the RFL dip was followed by successively drying for 120 seconds at 150° C. and for 30 seconds at 240° C. With the polyurethane dip applied to cord B the drying and curing conditions after the first and the second bath were as follows:

The first dip was followed by drying for 120 seconds at 150° C. and continued drying for 90 seconds at 245° C. Applying the RFL dip was followed by heating for 60 seconds at 245° C.

Of the cords A and B embedded in a rubber blend for V-belts the degree of adhesion, the rubber coverage (RC) and the fraying upon cutting were compared. The results are listed in the table below.

| cord | adhesion % well-known dip = 100% | RC (%) | fraying open cutting rubber-cord composite |
|---|---|---|---|
| cord A, dipped by well-known process | 100 | 80 | severe |
| cord B, dipped by process of the invention | 110 | 100 | minor |

The results in the above table clearly show that use in the first bath of a two-step dipping process of a polyurethane dispersion according to the invention leads to better adhesion of the cord and to reduced fraying upon cutting out cord embedded in rubber.

EXAMPLE XXI

Use being made of the same procedure as given in Examale XVIII a number of cords of poly-p-phenylene terephthalamide of the construction dtex 1680×3 (290/270) were dipped in polyurethane dispersions of the Examples II, VI, IX and XIII.

A concentration of 8% by weight of polyurethane resulted in the properties mentioned in the table below measured after drying and upon applying an RFL dip.

| polyurethane dispersion of example | adhesion N/2 cm | rubber coverage (RC) % | fatigue (GBF) % |
|---|---|---|---|
| II | 88 | 80 | 48 |
| VI | 86 | 80 | 58 |
| IX | 86 | 70 | 58 |
| XIII | 45 | 10 | 73 |

The above table clearly shows that applying a polyurethane dispersion prepared using a polymer of a relatively high molecular weight as in Example XIII results in less satisfactory adhesion and an absolutely insufficient degree of coverage (RC).

We claim:

1. A process for the improvement of the adhesion to rubber or a thermoplastic elastomer of synthetic yarns, cords or fabrics by applying to said synthetic yarns, cords or fabrics an adhesive consisting of an aqueous solution or dispersion of a polyurethane with ionic groups, capped isocyanate groups and groups with a Zerewitinoff-active H atom, followed by drying the product thus treated, characterized in that the polyurethane corresponds to the following structure:

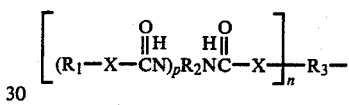

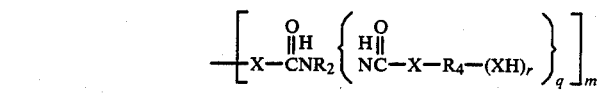

wherein X has the meaning of an O or S atom or of an O-, S-, N- or P-containing group with a Zerewitinoff-active H atom or to which prior to reaction with an isocyanate group a Zerewitinoff-active H atom had been attached, $R_1$ represents the remainder of a capping agent, $R_2$ represents an at least divalent organic group which remains after removal of isocyanate groups from a polyisocyanate, $R_3$ represents an at least divalent organic group which remains after removal of —XH groups from an organic compound having a molecular weight of 62 to 2000, $R_4$ represents an ionic group or a potentially ionic group which remains after removal of —XH group(s), m is a number $\geq 1$ and $\leq 4$, n is a number $\geq 1$ and $\leq 4$, p is a number $\geq 1$ and $\leq 3$, q is a number $\geq 1$ and $\leq 3$, and r is a number $\geq 0$ and $\leq 3$.

2. A process according to claim 1, characterized in that the ionic group is a quaternary ammonium group.

3. A process according to claim 1, wherein $R_3$ is derived from a compound of the formula $R_3(OH)_{m+n}$, which represents a polyester having a molecular weight in the range of 300 to 1000 and an average number of hydroxyl groups in the range of 2 to 4.

4. The process according to claim 2, wherein $R_3$ is derived from a compound of the formula $R_3(OH)_{m+n}$, which represents a polyester having a molecular weight in the range of 300 to 1000 and an average number of hydroxyl groups in the range of 2 to 4.

5. The process according to claim 1, wherein $R_4$ is derived from a compound of the formula $HOR_4OH$.

6. The process according to claim 2, wherein $R_4$ is derived from a compound of the formula $HOR_4OH$.

7. The process according to claim 3, wherein $R_4$ is derived from a compound of the formula $HOR_4OH$.

8. The process according to claim 4, wherein $R_4$ is derived from a compound of the formula $HOR_4OH$.

9. The process according to claims 5, 6, 7 or 8, wherein the compound of $HOR_4OH$ is N-methyl diethanol amine or 1,2-propane diol-3-dimethyl amine.

10. The process according to claim 1, wherein the polyisocyanate is selected from the group consisting of 2,4-toluene diisocyanate, 2,6-toluene diisocyanate, diphenyl methane-4,4'-diisocyanate, and a mixture of 2,4 and 2,6 toluene diisocyanate.

11. The process according to claim 1, wherein the capping agent is selected from the group consisting of ϵ—caprolactam and methylethyl ketoxime.

12. The process according to claim 1, wherein the dispersion contains 1 to 40% by weight of polyurethane.

13. The process according to claim 2, wherein the dispersion contains 1 to 40% by weight of polyurethane.

14. The process according to claim 3, wherein the dispersion contains 1 to 40% by weight of polyurethane.

15. The process according to claim 4, wherein the dispersion contains 1 to 40% by weight of polyurethane.

* * * * *